United States Patent
Totaro et al.

(10) Patent No.: US 6,259,921 B1
(45) Date of Patent: *Jul. 10, 2001

(54) COMMUNICATION ROUTING METHOD BY A SATELLITE IN A NETWORK

(75) Inventors: Antoine Totaro, Muret; Erick Flores, Toulouse; Jean Charpentier, Viroflay; Roland Thies, Paris, all of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,368
(22) PCT Filed: May 7, 1998
(86) PCT No.: PCT/FR98/00925
 § 371 Date: Jan. 5, 1999
 § 102(e) Date: Jan. 5, 1999
(87) PCT Pub. No.: WO98/51020
 PCT Pub. Date: Nov. 12, 1998

(30) Foreign Application Priority Data

May 7, 1997 (FR) .................................................. 97 05638

(51) Int. Cl.[7] ........................................................ H04Q 7/20
(52) U.S. Cl. ............................ 455/445; 455/456; 455/525
(58) Field of Search .................................... 455/427, 428, 455/455, 456, 445, 12.1, 430, 525

(56) References Cited

U.S. PATENT DOCUMENTS 5,303,286 * 4/1994 Wiedeman ................................ 379/59
5,481,592   1/1996 Azer .
6,009,085 * 12/1999 Lechner ................................. 370/324
6,009,306 * 12/1999 Hargis .................................. 455/12.1

FOREIGN PATENT DOCUMENTS 0 562 374 A1   9/1993 (EP) .
2 281 014      2/1995 (GB) .
2 295 296      5/1996 (GB) .

* cited by examiner

Primary Examiner—Edward F. Urban
Assistant Examiner—Marceau Milord
(74) Attorney, Agent, or Firm—Sughrue, Mion, Zinn, Macpeak & Seas, PLLC

(57) ABSTRACT

The present invention relates to a method of routing a call between a first terminal which is a mobile terminal (5) and a second terminal (4) in a global telecommunications network, it being possible for the call to be routed in the global network a)—at least in part through a satellite telecommunications network (1) using base stations (2, 3) giving access to satellites, and b) —at least in part through a terrestrial telecommunications network (PSTN) connected to the base stations (2, 3), each satellite (1) in the satellite telecommunications network defining an overall coverage area covering a plurality of base stations, the overall coverage area defining a plurality of coverage sub-areas, each of which is associated with a respective one of the base stations (2, 3). The method is characterized in that it includes a location updating step in which the location of the first terminal (5) is updated as being in coverage sub-area associated with that one of the base stations (2, 3) which is closest to the second terminal so as to minimize the routing distance over which the call travels through the terrestrial telecommunications network (PSTN).

8 Claims, 2 Drawing Sheets

COMMUNICATION ROUTING METHOD BY A SATELLITE IN A NETWORK

The present invention generally relates to a satellite telecommunications network for mobile stations. More particularly, the invention relates to such a network in which a call set up between a mobile terminal and some other terminal, be it mobile or fixed, is conveyed in part over terrestrial network(s), such as PSTN(s) or ISDN(s). Thus, using known techniques, a call set up between two terminals, namely a mobile terminal and a fixed terminal, is conveyed: (1)—via a satellite link or a radio link between the mobile terminal and a terrestrial base station (or "gateway"); and (2)—via a terrestrial link between said base station and the fixed terminal. Similarly, a call set up between two mobile terminals is conveyed: (1)—via a satellite link or a radio link between one of the mobile stations and a terrestrial base station (or "gateway"); (2)—via a terrestrial link (PSTN) between said base station and another terrestrial base station; and finally (3)—via a satellite link or a radio link between the other terrestrial base station and the other mobile terminal. The type of network concerned by the invention is a network in which the terminals are mobile. In such a network, firstly each mobile terminal is capable of accessing the network from various places while it is travelling, and secondly the network is capable of identifying, locating, and reaching said terminal. For this purpose, the network stores location information for locating the terminal, which information is updated by means of a registration procedure referred to as a "location updating procedures".

In the prior art, each mobile terminal accesses the terrestrial network firstly via a satellite and secondly via that base station which is closest to it. In the remainder of the description, the term "gateway" is used to designate a section constituted by a base station and by a Mobile Switching Center (MSC). The purpose of choosing the base station that is closest to the terminal for accessing the terrestrial network is to minimize power losses in the link between the terminal and the terrestrial base station via the satellite.

The services offered by satellite networks are superposed on the already existing services provided by terrestrial networks. That results in a possibly critical increase in traffic in terrestrial networks. Furthermore, the fact that each terminal accesses the terrestrial network via the base station that is closest to the terminal can give rise to call costs that are high.

Patent Application GB-A-2 281 014 describes a satellite telecommunications system in which a call between a mobile terminal and a fixed terminal is routed via that base station or gateway which offers the shortest routing path through the terrestrial network (PSTN). The solution proposed in that Application thus reduces traffic loading in the terrestrial network (PSTN). However, it does not solve the problem of the high call cost charged to the user.

An object of the invention is to remedy that drawback by providing a method of routing calls, and also a terminal and a base station for implementing this particularly advantageous method.

To this end, the invention provides a method of routing a call between a first terminal which is a mobile terminal and a second terminal in a global telecommunications network, it being possible for said call to be routed in said global network a)—at least in part through a satellite telecommunications network by using base stations, and b)—at least in part through a terrestrial telecommunications network connected to said base stations, said call being routed via a base station that minimizes the routing distance over which said call travels through said terrestrial telecommunications network, said method being characterized in that, prior to setting up said call, said method includes a location updating step in which the location of the first terminal is updated as being in the coverage area associated with the base station that minimizes the routing distance over which the call travels through said terrestrial telecommunications network, the updated location being different from said first terminal's current location. This step goes against the conventional location updating procedure because in this case location is updated as being in a base station coverage area which is not the coverage area in which the terminal receives a signal of maximum power. Such location updating is "forced".

In the terrestrial network, the cost of the call charged to the user is calculated as a function of the location information as previously updated in "forced" manner, and said cost thus takes into account the real routing path followed by the call through the PSTN. Other advantages of updating the location information prior to setting up the call are to enable another call to be received, to avoid losing information transmitted to a user whose location has not been updated, etc.

In addition, whenever possible, the call is routed mainly via the satellite links, thereby avoiding overloading the terrestrial network, and reducing the cost of the call. The reduction in cost is due to the fact that a satellite network infrastructure is lower in cost than a terrestrial network infrastructure.

In a first implementation, the first terminal is a calling terminal, and the location of said first terminal is updated as being in the coverage sub-area of the base station that is closest to said second terminal which is a called terminal. A mobile terminal suitable for using this implementation includes memory means for storing association information that associates each of a plurality of called number prefixes, which are functions of call areas, with base station identification information, and means for updating location as being in an identified base station.

In a second implementation, the first terminal is a called terminal, and the location of said first terminal is updated in the base station that is closest to said second terminal which is a calling terminal. A master base station suitable for using this implementation includes means responding to location information received from the base station that is closest to said second terminal by producing location update trigger information which is transmitted to the base station that is associated with the coverage sub-area to which said first terminal belongs, which base station re-transmits said location update trigger information to the first terminal so that said first terminal updates the location as being in the coverage area of the base station that is closest to said second terminal.

Other characteristics and advantages of the present invention appear more clearly on reading the following description given with reference to the accompanying drawings, in which.

In the following description, reference is made to the elementary concepts enabling terminals to be mobile in a telecommunications network, and to a practical implementation for which use is made of the ETSI terminology and Recommendations for the Global System for Mobile communication (GSM), the contents of those Recommendations, in particular those relating to Mobility Management (MM), being included by reference in the present Application. However, the invention is applicable to any global network, in which the terminals are mobile, and which uses both a satellite network and a terrestrial network, such as an ISDN or a PSTN, etc. in combination to route calls. By way of example, it is assumed that access to the terrestrial network uses GSMtype procedures.

Figure 1:
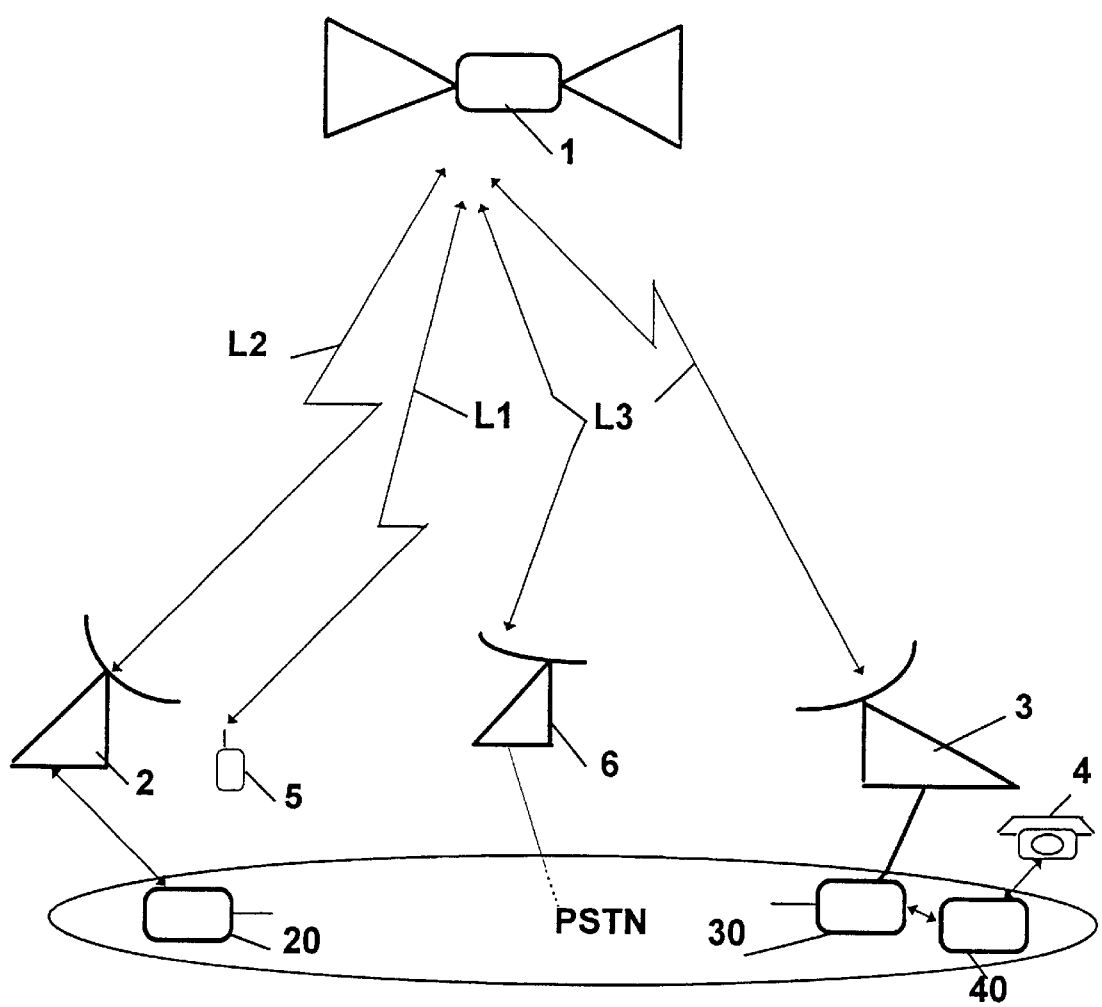
FIG. 1 is a diagram showing a satellite network in which the method of the invention is implemented.

As shown in FIG. 1, a telecommunications network for implementing the invention comprises a terrestrial network, of the PSTN type or of the ISDN type, on which base stations 2, 3, and 6 are parented, which base stations provide access to a satellite network 1. The base stations access the terrestrial network PSTN via switching centers 20, 30. The resulting pairs 3 & 30 and 2 & 20 constitute gateways. Whenever a mobile terminal 5 is involved in a call, either for the purpose of receiving a call from a terminal 4 that can be a fixed terminal or a mobile terminal, or for the purpose of setting up a call with said terminal 4, the satellite network 1 is used. The base station 2 and 3 then offer access between the terrestrial network and the satellite network. As appears in more detail below, the base station 6 is a master base station.

The satellite network typically includes a plurality of satellites 1, each of which defines an overall coverage area covering a plurality of base stations 2 and 3, the overall coverage area defining a plurality of coverage sub-areas, each of which is associated with a respective one of the base stations 2 and 3. By using a technique of the Frequency Division Multiple Access (FDMA) type, of the Space Division Multiple Access (SDMA) type, of the Code Division Multiple Access (CDMA) type or of some other type, each base station associated with a satellite is allocated only a portion of the total capacity for data interchange with the satellite 1. Typically, the satellite network accesses location data bases (not shown) via the base stations 2, 3 for the purpose of locating the mobile terminals 5. The location data bases store location information concerning the location of each mobile terminal 5, each mobile terminal updating such data bases as it moves.

In the invention, in order to minimize, or even reduce to zero, the routing distance through the terrestrial network of a call set up between a mobile first terminal and a second terminal that can be a mobile terminal or a fixed terminal, a location updating step is provided for updating the location of the first terminal as being in the coverage sub-area of that base station which is closest to the second terminal.

One of two different variants may be chosen depending on whether the mobile terminal 5 is a calling terminal or a called terminal.

These two variants are now examined in succession.

A/ The Mobile Terminal 5 is a Calling Terminal

Figure 2:
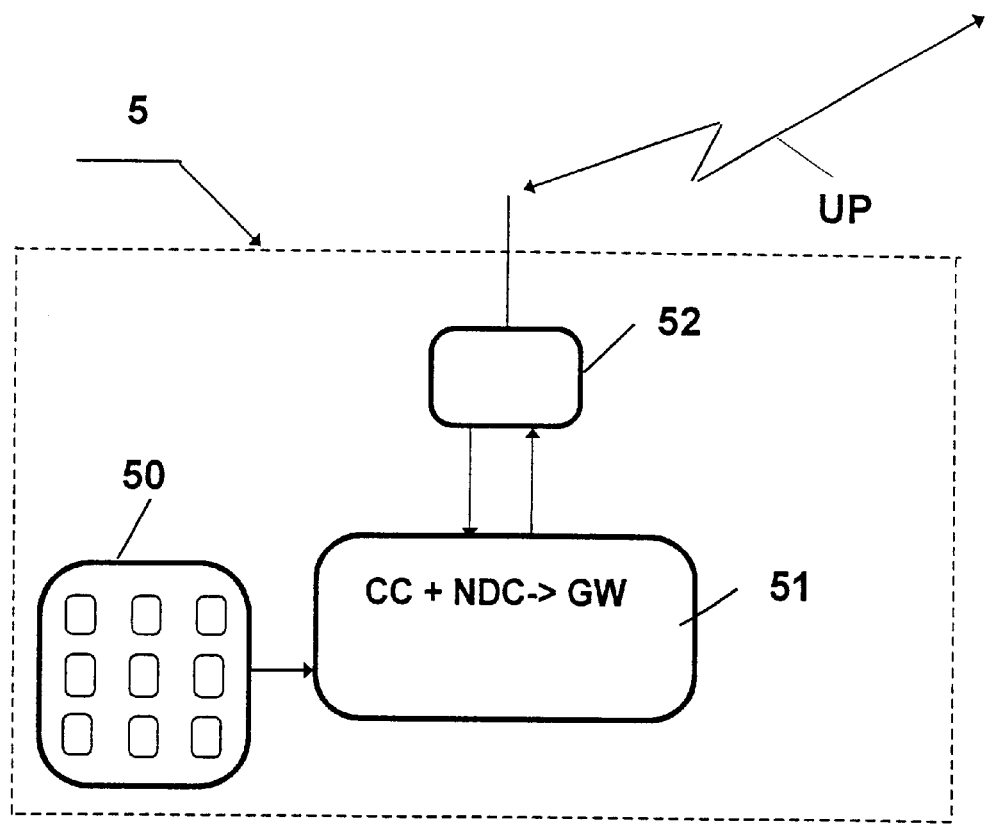
FIG. 2 is a diagram showing a terminal for implementing the invention.

Reference is made to FIGS. 1 and 2 for describing this first variant. The mobile terminal 5 is initially registered in a data base as being located in the coverage sub-area associated with the base station 2 and is handled by the base station 2, the base station 2 being the base station that is closest to the terminal 5.

For the purpose of initializing a call so as to set up call with a remote terminal, e.g. a fixed terminal 4, the user of the mobile terminal 5 enters the called number into said mobile terminal by means of the keypad 50. The format of the telephone number includes successively a Country Code (CC) prefix, a National Destination Code (NDC) prefix, and a Subscriber Number (SN). In accordance with the invention, the mobile terminal 5 further includes an association memory 51 which stores association information which associates each of a plurality of called number prefixes CC and NDC, which are functions of call areas, with base station identification information GW. The base station identified (GW) as a function of the prefix information CC and NDC is the base station 3 that is closest to the called terminal, which is assumed to be the fixed terminal 4 in FIG. 2.

Initially (prior to selling the mobile terminal 5), the association memory 51 may be loaded as a function firstly of the geographical positions of the base stations 2, 3 and secondly of the prefixes CC and NDC associated with the geographical areas covered by the base stations. The association memory can also be updated, e.g. by radio, as a function of how the network develops: e.g. because of new base stations being added, or of changes in the numbering plan, etc.

On the basis of the identification information GW that identifies a base station 3, the mobile terminal 5 deduces, if necessary, the specific resource or channel to be used to access the base station. The specific resource to be used may be a particular frequency in FDMA, an orthogonal code in CDMA, etc. As a function of this information, the mobile terminal 5 transmits a location update message UP to the base station 3 via a transmit/receive unit 52. The message is received by the base station 3 which registers the mobile terminal 5 in a data base that is associated with it. This "forced" updating of the location of the mobile terminal 5 as being in the coverage sub-area associated with the base station 3 then offers the terminal 5 the possibility of using the base station 3 to set up a call. The term "forced" is used herein to emphasize the following major characteristic of the invention: unlike in conventional procedures of the GSM type in which the terminal always registers in the base station that is closest to it, the terminal registers in the base station that minimizes the routing distance of the call through the terrestrial telecommunications network (PSTN or ISDN). The location of the first terminal can thus be updated as being in the coverage area associated with the base station that minimizes the routing distance of the call through the terrestrial telecommunications network, the updated location being different from a current location of said first terminal.

It should be noted that, in the above description, it is possible to use either the prefix CC only or the prefix NDC only, instead of using both prefixes CC and NDC.

After registering, by updating the location as being in the coverage area of the base station 3, the terminal thus sets up a call with the terminal 4 via the satellite 1 and via the base station 3 by using the links L1 and L3, in compliance with a conventional procedure. As a result, the routing distance travelled by the call through the terrestrial network is very significantly reduced.

At the end of the call, the mobile terminal 5 reregisters automatically as belonging to the coverage area of the original base station 2. For this purpose, memory space is provided in the terminal for storing identity data identifying the base station 2. In practice, the memory space and the memory 51 may be situated either in a memory of the terminal or else in a chip card of the Subscriber Identity Module (SIM) card type.

B/ The Mobile Terminal 5 is a Called Terminal

Figure 3:
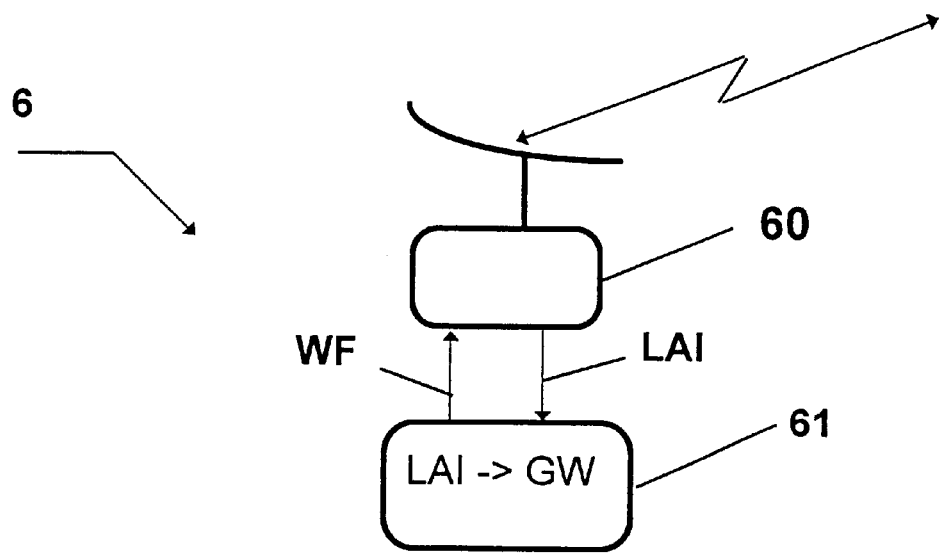
FIG. 3 is a diagram showing a master base station for implementing the invention.

Reference is now made to FIGS. 1 and 3 for explaining this second variant of the invention. In this variant, it is assumed that the calling terminal is the terminal 4, the mobile terminal 5 being the a terminal.

In compliance with the procedures for handling incoming calls, as defined by GSM Recommendations, the incoming call is routed by the terrestrial network PSTN to the gateway MSC (GMSC). As defined by GSM Recommendations, the Mobile Switching Center (MSC) handles and routes the calls for the mobile stations. In the diagram shown in FIG. 1, an MSC 30 is associated with or integrated in the base station 3 to form a gateway. In response to receiving a set-up request from the terminal 4, and as a result of interchange with a Home Location Register (HLR) managing the called mobile terminal 5, the MSC 30 receives location information indicating the location of the mobile station, the information being referred to as a Location Area Identifier (LAI). As a result of receiving this information LAI, the MSC 30 verifies whether the coverage area associated with the LAI is under its responsibility. For this purpose, the MSC 30 is provided with a verification program. If the answer is "yes", the call is set up immediately via the base station 3. Otherwise, the information LAI is re-transmitted via the satellite 1 to the "master" base station 6 which manages the network by interchanging messages with the base stations 2 and 3. As shown in FIG. 3, the master base station 6 includes a transmitter/receiver 60 and a correspondence table 61 indicating the correspondence between the information LAI and the gateway (3, 30) or (2, 20) in charge of the mobile stations in the coverage area associated with the LAI. The master base station 6 responds to the location information LAI received from the base station 3 that is closest to the terminal 4 by producing location update trigger information which is transmitted via the satellite 1 to the base station 2 that is associated with the coverage sub-area to which the called terminal 5 belongs. The base station 2 then re-transmits location update trigger information to the terminal 5 so that said terminal updates the location as being in the coverage sub-area of the base station 3 that is closest to the terminal 4. Thus, the terminal 5 registers in "forced" manner in the coverage area of the base station 3. The routing distance of the call through the terrestrial network is then reduced.

It should be noted that, in the particular case when both the called terminal and the calling terminal are mobile terminals, only one of the above-described procedures should be applied. For example, only the procedure described under B/ applies. For this purpose, the calling mobile terminal is provided with means for detecting whether the called terminal is a mobile terminal, as a function of the prefix of the called number. If such is the case, said calling terminal prevents the procedure described under A/ from being implemented by deactivating the means for updating location in a base station. The called mobile terminal implements the procedure described under B/.

What is claimed is:

1. A method of routing a call between a mobile first terminal and a second terminal in a global telecommunications network, it being possible for said call to be routed in said global network a) at least in part through a satellite telecommunications network using base stations giving access to satellites, and b) at least in part through a terrestrial telecommunications network connected to said base stations, said call being routed via a base station that minimizes the routing distance over which said call travels through said terrestrial telecommunications network, said method being characterized in that, prior to setting up each said call, said method includes a location updating step in which the location of the first terminal is updated as being in the coverage area associated with the base station that is closest to said second terminal and which minimizes the routing distance over which the call travels through said terrestrial telecommunications network, the updated location being different from said first terminal's current location.

2. A method according to claim 1, characterized in that the first terminal (5) is a calling terminal in that the location of said first terminal (5) is updated as being in the coverage area of the base station (3) that is closest to said second terminal (4) which called terminal.

3. A method according to claim 1, characterized in that the first terminal (5) is a called terminal, and in that the location of said first terminal (5) is updated as being in the coverage area of the base station (3) that is closest to said second terminal (4) which is a calling terminal.

4. A mobile terminal for implementing the method according to claim 2, said mobile terminal being characterized in that it includes memory means (51) for storing association information that associates each of a plurality of called number prefixes (CC, ND), which are functions of call areas, with base station identification information (GW), and location updating means for updating location as being in an identified base station.

5. A mobile terminal according to claim 4, characterized in that said memory means are located in a chip card.

6. A mobile terminal according to claim 4, characterized in that it includes means for detecting whether the called terminal is a mobile terminal, as a function of the called number prefix, and means for deactivating said location updating means accordingly.

7. A base station for implementing the method according to claim 3, said base station being characterized in that it includes means responding to location information received from the base station (3) that is closest to said second terminal (4) by producing location update trigger information which is transmitted to the base station (2) that is associated with the coverage area to which said first terminal (5) belongs, which base station (2) re-transmits said location update trigger information to the first terminal (5) so that said first terminal updates the location as being in the coverage area of the base station (3) that is closest to said second terminal (4).

8. A method according to claim 1, wherein said location updating step is performed prior to each call involving said first terminal.

* * * * *